United States Patent [19]

Venthem

[11] Patent Number: 5,214,448
[45] Date of Patent: May 25, 1993

[54] BELT-DRIVE TENSIONING SYSTEM WHICH USES A PIVOTING MEMBER

[75] Inventor: John C. Venthem, Georgetown, Tex.

[73] Assignee: Summagraphics Corporation, Seymour, Conn.

[21] Appl. No.: 738,573

[22] Filed: Jul. 31, 1991

[51] Int. Cl.⁵ .............................. G01D 15/16
[52] U.S. Cl. .................. 346/139 R; 310/91; 474/114; 474/117
[58] Field of Search ............ 346/29, 136, 139 R; 474/101, 113–117, 133–136, 138; 310/51, 91; 248/562, 665; 74/89.22

[56] References Cited

U.S. PATENT DOCUMENTS

| 3,544,048 | 12/1970 | Oshima | 310/91 X |
| 4,678,953 | 7/1987 | Johnson | 310/91 |

Primary Examiner—A. T. Grimley
Assistant Examiner—William J. Royer
Attorney, Agent, or Firm—Rosen, Dainow & Jacobs

[57] ABSTRACT

A belt drive tensioning system for a motor drive positioning system, especially for X-Y digital plotters. The tensioning system employs spring-loading involving pivoting motion of a motor-mounted plate relative to a fixed plate to accurately preset and maintain constant the desired belt tension. A preferred embodiment provides a self-contained modular unit using two pivot bushings interconnecting the two plates.

18 Claims, 3 Drawing Sheets

BELT-DRIVE TENSIONING SYSTEM WHICH USES A PIVOTING MEMBER

This invention relates to a belt-drive tensioning system,
in particular to belt-drive tensioning systems that are useful in apparatus that impose high demands on the accuracy and repeatability of a motor drive positioning system, such as in X-Y plotters.

BACKGROUND OF THE INVENTION

There are many applications for positioning systems having accurate controllable motor drives. One common application is in X-Y plotters. The typical plotter employs an X-axis drive mechanism for the chart or like media, and a Y-axis drive for the pen, the combination of movements allowing the plotter to produce virtually any kind of line drawing on the chart.

A desirable condition for the drive mechanisms in such apparatus is that there should be minimum slippage and backlash in the system. This is required because the execution of a line drawing by the plotter requires that the chart continuously move back and forth in the X-direction, and it is important that the X-axis drive mechanism be capable of repeatedly positioning the chart to very close tolerances at the selected positions along the X-axis. The same requirement, of course, exists for the Y-axis drive mechanism for the pen.

These problems are exacerbated when a synchronous belt-pulley system is employed in the drive mechanism, rather than spur gears. The former system is preferred mainly because it reduces the cost of the drive mechanism, and it somewhat simplifies the location of parts in a housing that historically has become more miniaturized. But, to satisfy the requirements indicated above with a belt-pulley drive system requires a mechanism not only for providing the proper tension on the belt, but also for maintaining the belt tension at the correct value despite pulley eccentricity and other variables during the lifetime of the product.

In one known system, a spring-loaded, cam-driven, idler roller operates against the outer surface of the belt producing a reverse wrap which provides the required tension. However, this arrangement applies tension and compression loads to the belt for which it was not designed.

SUMMARY OF THE INVENTION

An object of the invention is a drive mechanism with a belt drive capable of providing accurate and substantially constant tensioning of the belt to produce a relatively low-cost yet highly accurate drive mechanism.

Another object is a belt-pulley drive system, especially for use in plotters, that provides substantially constant belt tensioning, that is substantially backlash-free, and that is modular.

In accordance with one aspect of the invention, in a motor-drive mechanism employing a belt and pulley drive, means are provided for accurately tensioning and maintaining the tension of the drive belt. These means comprise mounting of the motor on a pivoting member in such manner that the pivoting member is capable of repeated small movements in response to pulley eccentricities or other imperfections while maintaining the original tension.

In accordance with a further aspect of the invention, the motor mount for the drive mechanism is a plate-like member supported by pivot bushings on a fixed support member, with the plate-like member pivotable over small angles about the bushings, and with means for biasing the pivotable plate-like member with respect to the fixed support member to provide the desired belt tension.

BRIEF DESCRIPTION OF THE DRAWINGS

The above description as well as further objects, features and advantages of the present invention will be more fully understood by reference to the following detailed description of presently preferred embodiments of the present invention, taken in conjunction with the accompanying drawings.

In the drawings.

DETAILED DESCRIPTION OF THE PREFERRED EMBODIMENTS

While the invention is applicable to any kind of a drive mechanism employing a belt-pulley system and capable of highly-accurate operation, an especially important application for the belt-drive mechanism of the invention is in X-Y digital plotters. The environment of a plotter will be used in order to illustrate the preferred embodiments of the invention, though again it is emphasized that this is merely exemplary and it is not intended for the invention to be limited thereto. Since essentially everything but the actual drive mechanism of existing digital plotters remain unchanged when the belt-drive mechanism of the invention is substituted, it is unnecessary to provide a description of the well-known plotter itself. For those who desire a more detailed description of a typical high-quality plotter, reference is had to U.S. Pat. No. 4,734,716, whose contents are hereby incorporated by reference.

Figure 1:
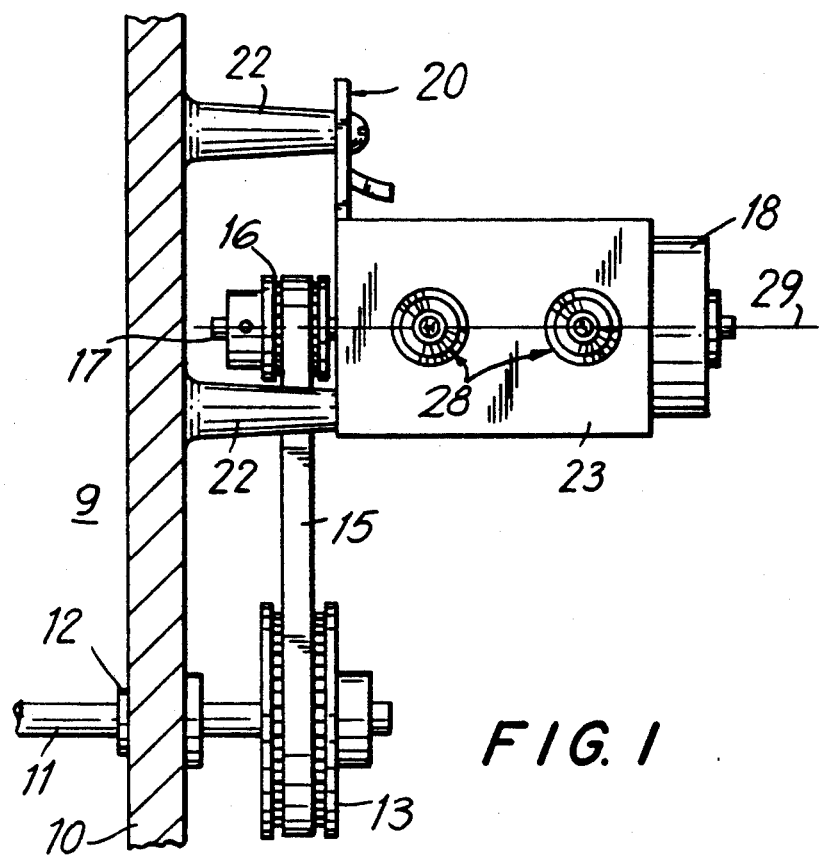
FIG. 1 is a side view of one form of spring-loaded belt-pulley drive mechanism in accordance with the invention shown mounted on a chassis wall.
Figure 2:
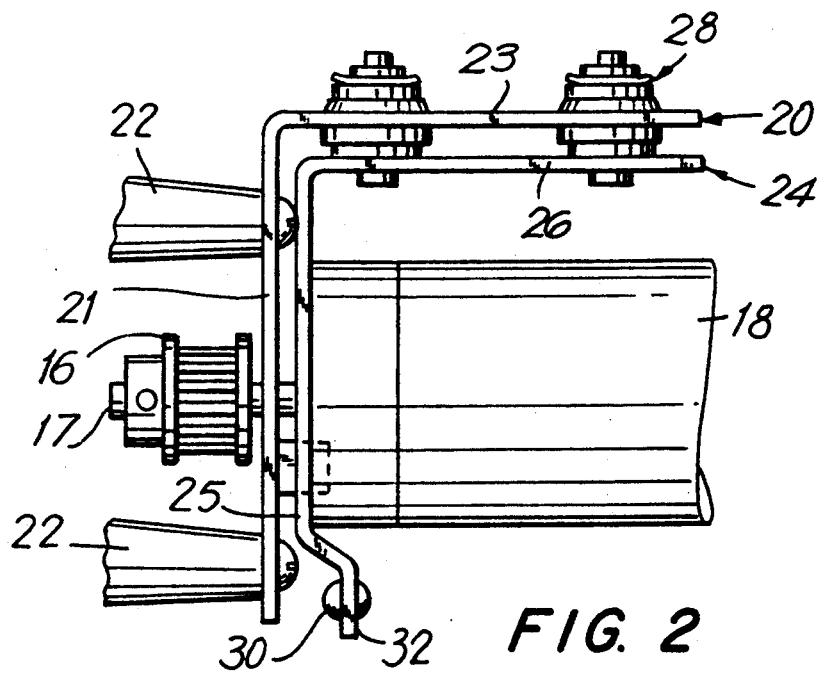
FIG. 2 is a view form the top of the drive mechanism of FIG. 1 with the chassis wall and belt omitted.

In the environment of a digital plotter, the invention concerns the drive mechanism for either the typical X-axis media drive or the Y-axis pen drive. The basic system for one embodiment is illustrated in FIG. 1. The plotter comprises a fixed chassis or frame 9 whose end plate or wall is shown at 10. A shaft 11 is journalled 12 in the end plate 10. The shaft 11 when rotated drives, for example, the plotter media. On the outside of the frame end plate 10, a driven pulley 13 is secured to the shaft 11, and a synchronous drive belt 15 engages the pulley 13. The other end of the belt 15 engages a driving pulley 16 secured to the shaft 17 of an electric motor 18.

The synchronous belt 15, which interconnects the two pulleys 13, 16, is conventional, e.g. reinforced by Kevlar. The object is to provide a method to pre-tension the belt 15 that will enable such belt pre-tension to remain substantially constant in service during the life of the product. Factors that tend to change the belt's tension include, mainly, pulley eccentricities and the belt pitch error. Spring-loading of the motor 18 relative to the frame can pre-set the tension, but the motor has to move to be able to compensate for the above factors, and the way that that movement is accomplished is a feature of the present invention.

In the preferred embodiment, a generally L-shaped fixed mounting plate 20 is provided, a first side 21 of which is anchored or fixed to the frame end plate 10 by means of rigid mounting posts 22. The motor 18, whose shaft 17 passes through a clearance hole of the plate side 21, in turn is fixedly mounted as by screws or the like to a pivoting plate 24, also generally L-shaped. A first side 25 of this L-shaped pivoting plate directly supports the motor housing, whereas the second side 26 is secured by a pivoting connection to the second side 23 of the fixed mounting plate 20.

Figure 5:
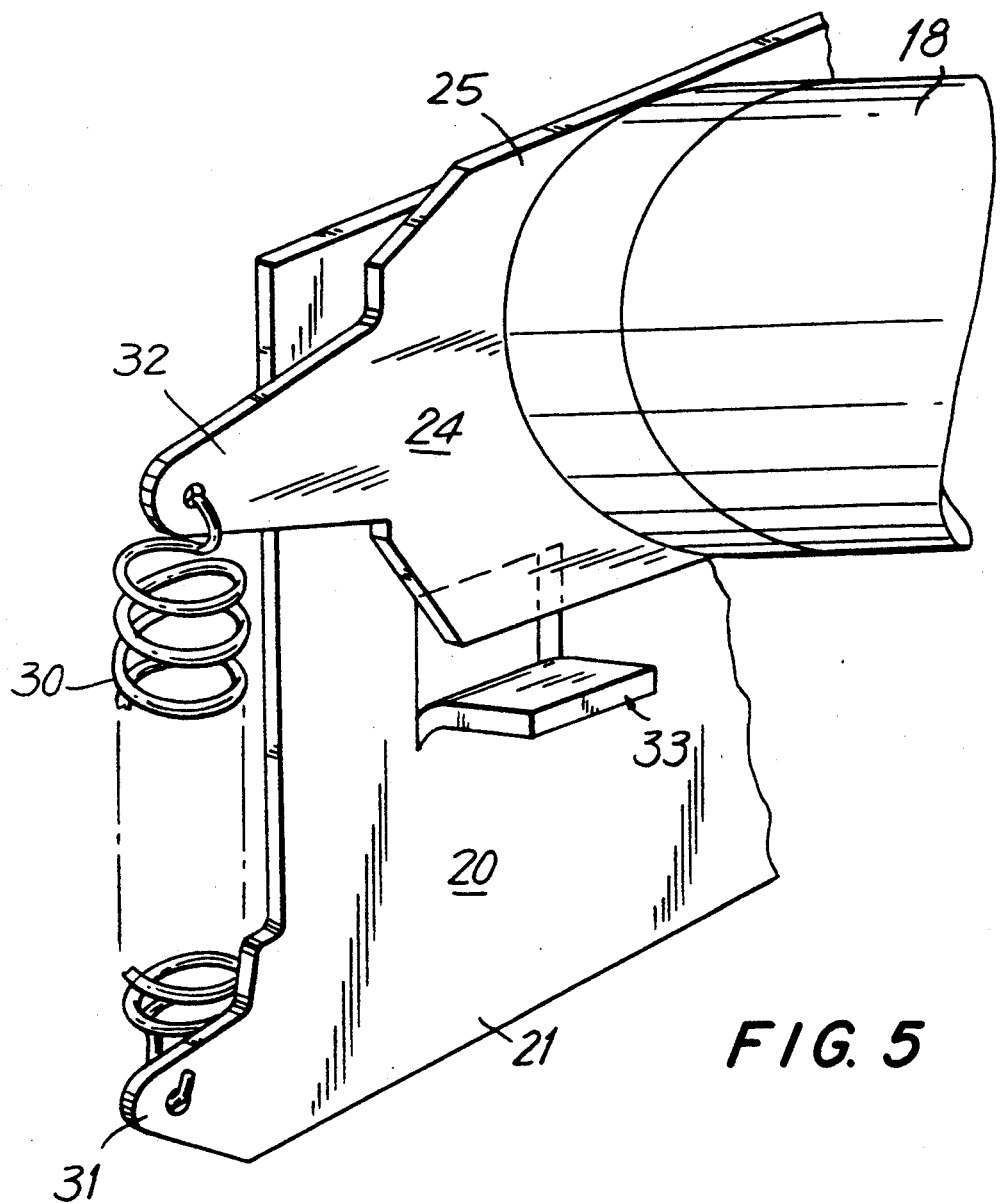
FIG. 5 is a perspective view of a part of the spring-loaded belt-pulley drive mechanism of FIG. 1.

The pivoting connection comprises two spaced pivot assemblies 28 (FIG. 1) about which the motor-supported pivoting plate 24 pivots. The pivoting plate 24 is biased with respect to the fixed plate 20 by a tension spring 30 which engages respective connection points 31, 32 in the two plates. A tab 33 bent 90° out of the plane of the fixed plate side 21 serves as a stop for the pivoting plate 24 (FIG. 5) in the unloaded condition, such as when the belt is removed.

Figure 4:
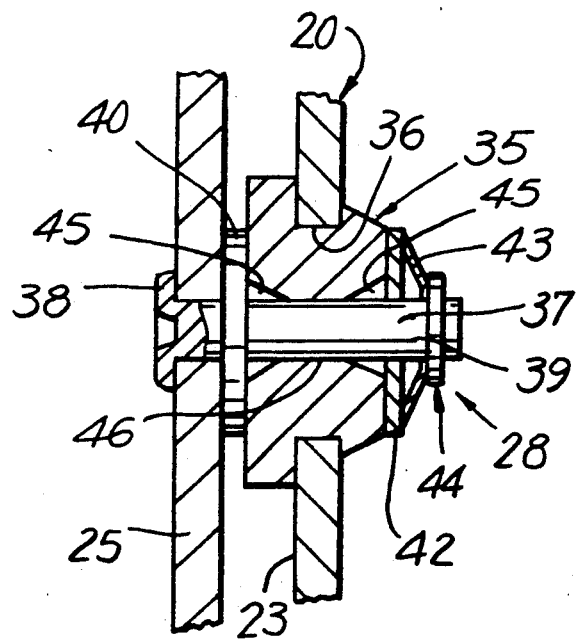
FIG. 4 is a cross-sectional view of one of the pivot bushings of the mechanism of FIG. 1.

The pivot assemblies 28 (FIG. 4) each comprise a plastic bushing 35, recessed at 36, to receive and be supported by the side wall 23 of the fixed plate 20, and is engaged by a metal pivot pin 37. The pin 37 comprises a head 38, a cylindrical body 39, a shoulder extension 40 near its head 38, and a groove (not shown) at the pen end. The shoulder 40 serves to space the face of bushing 35 from the moving plate wall 25. The pin 37 is secured to the bushing 35 by means of a washer 42, a curved spring washer 43, and a snap ring 44 which engages the groove at the pin end.

As will be observed, the inner bore 46 of the bushing 35 is bevelled 45 at a shallow included angle at both ends. That small bevel at both ends reduces the resistance to pin pivoting with respect to the bushing. The natural resilience of the bushing 35—which preferably is constituted of a stiff plastic, such as Delrin—also permits the required small relative movement between the centerlines of the pivot pin 37 and bushing 35. The spring washer 43 maintains an axial force on the assembly preventing looseness.

The invention operates in and improves a conventional plotter as follows:

In a belt and pulley drive system, pretensioning of the drive belt must occur to prevent the drive belt from slipping on the drive pulleys. More importantly, in a servo-system utilizing positional feedback, maintenance of constant belt tension and compliance is of paramount importance in overall system accuracy.

This pretensioning or preload as it is also called is measured in units of force and is dictated by several factors including belt width, distance between pulley centers, and power transmitted. The primary function of the belt-tensioning system of the invention is to provide the correct, designed preload to the drive belt.

But there is another important factor. In any rotating member, there exists a certain amount of what is called runout. Runout stems from imperfect manufacturing and represents the degree of eccentricity measured on the rotating members. Put another way, runout represents the amount of "out-of-roundness" in rotating bodies. The pulleys in a belt/pulley-drive system are not different from other drive elements. They are not perfectly round and the geometric center is always displaced, if even slightly, from the rotational center, so that the pulley is always at least slightly eccentric. For some belt/pulley systems this may not be critical. However, for those belt/pulley systems with certain kinds of belts, the problem is aggravated; this is particularly the case for so-called Kevlar belts made of aramid plastic material, which is very useful because of its long life and resistance to deformation. However, such Kevlar belts have very little compliance. Therefore, with runout even as small as 0.002 inches, a Kevlar-drive system with a fixed pulley center-to-center distance (not spring-loaded) will experience large variations in belt tension. This varying belt tension can have adverse effects on plot quality, bearing life, machine noise, and servo response, among other things. The belt-tensioning system in accordance with the present invention can be fairly described as runout insensitive, which means that it can adjust to runout by pivoting movement of the motor mount in such manner as to maintain essentially a constant belt tension. The pivoting action takes place about an axis represented by the straight line 29 passing through the centers of the pivot pins 37 of the two pivot assemblies 28.

Figure 3:
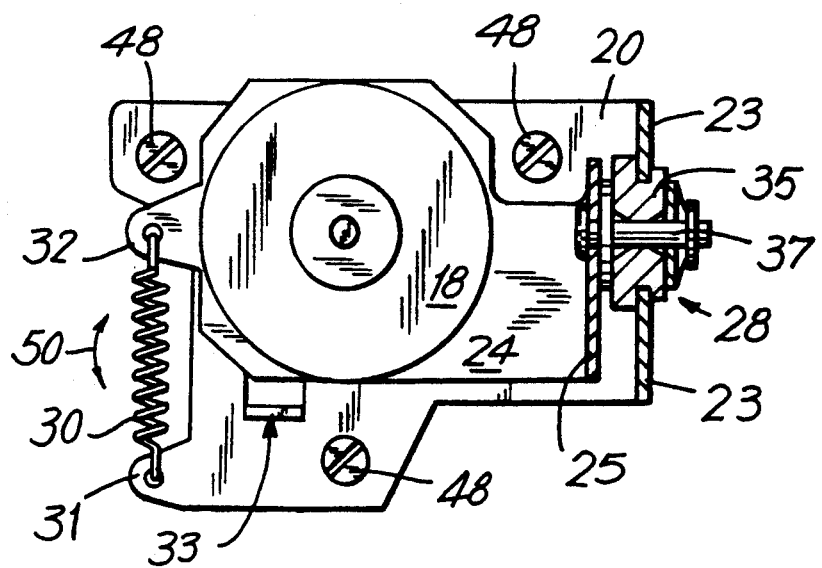
FIG. 3 is an end view of just the spring-loaded motor mount of FIG. 1.

The motor drive, it will be noted, is a self-contained module supported by the plate 20. In assembling the motor drive module to the plotter, the side wall 21 of the fixed plate 20 is simply bolted 48 to the plotter frame at the posts 22. Then, the belt 15 is assembled onto the pulleys 13, 16, in the course of which the motor 10 is forced clockwise (see arrow 50) in FIG. 3 until the belt is attached, and then released, the spring 30 pulling the motor-supported plate 20 counterclockwise in FIG. 3 to provide the desired preloading, determined substantially entirely by the tension spring 30. A typical belt tension is about 4 lbs., but this is not intended to be limiting.

The construction of the invention can accommodate approximately 0.125 inches of movement above and below the center position of the motor pulley 16. The rotational compliance of the system (due to torque reaction of the motor) is zero. The modular assembly makes it storable as a unit, and replacement in the field is thus facilitated. The overall system is substantially free from hysteresis and backlash, and can survive shocks encountered in shipping, handling, etc., with no damage.

Since the angle through which the pivot pins 37 move is very small, movement of the pins 37 within the plastic bushings 35 is also very small; of the order of only 0.005 inches for a total motor movement of about 0.125 inches. In actual service allowing for motor movement of 0.008 inches, the pivot pin movement would be only in the order of 0.0003 inches allowing the natural resilience of the plastic bushings to accommodate the movement.

Prototype models that were life tested at equivalent plotter speed of 64 ins/sec, after over 1000 hours, exhibited no radial clearances or play in the pin/bushing assembly, and no wear could be detected on the surface of the pivot pins, in the bores of the pivot bushings, or the interfaces of the pivot pin shoulder and the bushing ends.

While the invention has been described and illustrated in connection with preferred embodiments, many variations and modifications as will be evident to those skilled in this art may be made therein without departing from the spirit of the invention, and the invention as set forth in the appended claims is thus not to be limited to the precise details of construction set forth above as such variations and modifications are intended to be included within the scope of the appended claims.

What is claimed is:

1. A plotter comprising a housing and means on the housing for moving media or a pen along an axis, said moving means comprising:
   (a) an electrical motor having a first shaft and adapted to rotate its first shaft in response to electrical signals,
   (b) a second shaft coupled to the media or pen for driving same when rotated,
   (c) a drive belt interconnecting the first and second shafts,
   (d) means for pivotally mounting the motor on the plotter housing, said mounting means comprising first and second spaced pivot assemblies connected in such manner as to allow the motor to pivot with respect to the housing,
   (e) means for tensioning the drive belt, said tensioning means including means for resiliently urging the motor with respect to the housing in a direction to tension the belt.

2. A plotter comprising a housing and means on the housing for moving media or a pen along an axis, said moving means comprising:
   (a) an electrical motor having a first shaft and adapted to rotate its first shaft in response to electrical signals,
   (b) a second shaft connected to the media or pen for driving same when rotated,
   (c) means for mounting the motor on the plotter housing, said means comprising a first plate fixedly connected to the plotter housing, a second plate fixed to the motor, at least one pivot bushing connected to the first and second plates for supporting the second plate and motor on the first plate, each said bushing including means allowing the second plate to pivot with respect to the first plate,
   (d) a drive belt interconnecting the first and second shafts,
   (e) means for tensioning the drive belt, said tensioning means including means for spring-loading the said second plate with respect to the first plate in a direction to tension the belt.

3. The plotter of claim 1, wherein the pivot bushings are the sole means interconnecting the first and second plates.

4. The plotter of claim 1, wherein two pivot bushings are provided for connecting together the first and second plates.

5. The plotter of claim 2, wherein the first and second plates extend substantially parallel to one another.

6. The plotter of claim 5 wherein both the first and second plates are generally L-shaped.

7. The plotter of claim 2, wherein the bushing comprises a pivot pin connected to the second plate, a bushing body having a bore mounted to the first plate, said pin extending through the body bore, said bushing body being configured to allow the pin to pivot with respect thereto.

8. The plotter of claim 7, wherein said bushing body bore is bevelled at opposite ends which allows the pin to pivot about a center within the bushing bore.

9. The plotter of claim 8, further comprising a spring washer for holding the pin in the bushing bore.

10. The plotter of claim 7, wherein the pin comprises a shoulder portion whose diameter exceeds that of the bore, said shoulder portion lying between the second plate and an adjacent face of the bushing.

11. The plotter of claim 2, wherein means are provided on the first plate for stopping pivoting of the second plate in an unloaded condition.

12. A belt-pulley self-contained drive system comprising:
   (a) an electrical motor having a first shaft for receiving a pulley and belt and adapted to rotate its first shaft in response to electrical signals,
   (b) means for mounting the drive system on apparatus, said means comprising a first plate to be fixedly connected to the apparatus, a second plate fixed to the motor, at least one pivot bushing connected to the first and second plates for supporting the second plate and motor on the first plate, each said pivot bushing including means allowing the second plate to pivot with respect to the first plate,
   (c) means for spring-loading the second plate with respect to the first plate in a direction to tension the belt when assembled.

13. The drive system of claim 12, wherein the spring-loading is mounted to pivot the second plate with respect to the first plate.

14. The drive system of claim 13, further comprising means for stopping pivoting of the second plate beyond a certain point.

15. The system of claim 12, further comprising two pivot bushings.

16. The system of claim 15, wherein each pivotable bushing comprises a bushing body having a bore with bevelled ends mounted on the first plate, and a pivot pin secured to the second plate and engaging the bushing bore.

17. The system of claim 16, wherein said busing further comprises a spring washer on an end of the pin remote from the second plate, and a snap ring on the end of the pin holding the spring washer.

18. The systems of claim 17, wherein the pivot pin further comprises a head portion and spaced therefrom a shoulder portion.

* * * * *

UNITED STATES PATENT AND TRADEMARK OFFICE
CERTIFICATE OF CORRECTION

PATENT NO. : 5,214,448
DATED : May 25, 1993
INVENTOR(S) : John C. Venthem

It is certified that error appears in the above-indentified patent and that said Letters Patent is hereby corrected as shown below:

Column 2, line 19, change "form" to --from--.

Column 6, line 41, change "pivot" to --pivotable--.

Column 6, line 47, change "busing" to --bushing--.

Signed and Sealed this

Thirtieth Day of April, 1996

Attest:

BRUCE LEHMAN

Attesting Officer

Commissioner of Patents and Trademarks